(12) United States Patent
Tieman et al.

(10) Patent No.: US 8,559,981 B2
(45) Date of Patent: Oct. 15, 2013

(54) SYSTEM AND METHOD FOR CONTROLLING COMMUNICATION MODES OF A PERSONAL COMMUNICATION DEVICE TRAVELING IN A VEHICLE

(75) Inventors: Craig A. Tieman, Westfield, IN (US); Timothy D. Bolduc, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 252 days.

(21) Appl. No.: 13/118,816

(22) Filed: May 31, 2011

(65) Prior Publication Data

US 2012/0309296 A1 Dec. 6, 2012

(51) Int. Cl.
*H04W 24/00* (2009.01)

(52) U.S. Cl.
USPC ........................................ 455/456.4; 455/419

(58) Field of Classification Search
USPC ...................... 455/456.4, 419, 418
See application file for complete search history.

(56) References Cited

U.S. PATENT DOCUMENTS

| | | | |
|---|---|---|---|
| 6,188,315 B1 | 2/2001 | Herbert et al. | |
| 6,263,190 B1 | 7/2001 | Mamori et al. | |
| 6,353,778 B1 | 3/2002 | Brown | |
| 6,690,940 B1 * | 2/2004 | Brown et al. | 455/456.4 |
| 6,973,333 B1 * | 12/2005 | O'Neil | 455/569.2 |
| 7,505,784 B2 | 3/2009 | Barbera | |
| 2002/0065112 A1 | 5/2002 | Endoh et al. | |
| 2002/0177928 A1 | 11/2002 | Moriguchi et al. | |
| 2004/0077339 A1 * | 4/2004 | Martens | 455/414.1 |
| 2004/0198306 A1 | 10/2004 | Singh et al. | |
| 2004/0214615 A1 | 10/2004 | Entenmann et al. | |
| 2007/0072553 A1 | 3/2007 | Barbera | |
| 2008/0064446 A1 | 3/2008 | Camp et al. | |
| 2009/0098855 A1 * | 4/2009 | Fernandez et al. | 455/410 |
| 2009/0215466 A1 | 8/2009 | Ahl et al. | |
| 2009/0224931 A1 | 9/2009 | Dietz et al. | |
| 2010/0297929 A1 * | 11/2010 | Harris | 455/1 |
| 2011/0009107 A1 | 1/2011 | Guba et al. | |
| 2011/0039572 A1 | 2/2011 | Lamb et al. | |
| 2011/0065456 A1 * | 3/2011 | Brennan et al. | 455/456.4 |
| 2011/0076996 A1 | 3/2011 | Burton et al. | |
| 2012/0108269 A1 * | 5/2012 | Howarter et al. | 455/456.4 |
| 2012/0231773 A1 * | 9/2012 | Lipovski | 455/414.1 |

FOREIGN PATENT DOCUMENTS

| | | |
|---|---|---|
| EP | 1263146 | 12/2002 |
| WO | 2009/048657 A1 | 4/2009 |
| WO | 2009/105666 | 8/2009 |

OTHER PUBLICATIONS

European Search Report dated Oct. 15, 2012.
European Search Report dated Jan. 24, 2013.

\* cited by examiner

*Primary Examiner* — Lewis West
(74) *Attorney, Agent, or Firm* — Lawrence D. Hazelton

(57) ABSTRACT

A system and method for controlling communication modes of a personal communication device traveling in a vehicle. The system includes a communication center configured to provide communication services, a personal communication device (PCD) configured to communicate with the communication center, and a controller installed in a vehicle. The communication center is configured to selectively disable any of the PCD communication modes when the PCD is residing or traveling in the vehicle. Which communication modes are disabled may be based on a customer profile. The system and method provide a way for a parent to limit the communication modes of PCD used by their child, especially when the child is traveling in and presumably operating a particular vehicle such as the family car. The system and method may also be used by employers to limit the PCD communication modes available to employees operating company vehicles.

15 Claims, 2 Drawing Sheets

SYSTEM AND METHOD FOR CONTROLLING COMMUNICATION MODES OF A PERSONAL COMMUNICATION DEVICE TRAVELING IN A VEHICLE

TECHNICAL FIELD OF INVENTION

The invention generally relates to a system for controlling communication modes of a personal communication device, and more particularly relates to a system that selectively disables personal communication device communication modes when the personal communication device is traveling in the vehicle.

BACKGROUND OF INVENTION

It has been observed that conversing on a cell phone and/or sending text messages while operating a vehicle increases the risk of being involved in a collision. It has been suggested that personal communication devices such as cell phones or smart phones be configured to disable all or some communication modes such as sending text messages when the personal communication device is moving at a speed indicative of the personal communication device traveling in an automobile. However this solution causes personal communication devices to be disabled when it is generally safe to operate the personal communication device such as when traveling in a bus, train, or as a passenger in an automobile.

SUMMARY OF THE INVENTION

In accordance with one embodiment of this invention, a system for controlling communication modes of a personal communication device traveling in a vehicle is provided. The system includes a communication center, a personal communication device, and a controller. The communication center is configured to provide communication services. The personal communication device is configured to communicate data via one or more communication modes. The personal communication device is equipped with a first long-range transceiver configured to communicate with the communication center via at least one of the communication modes. The controller is installed in a vehicle. The controller is configured to cooperate with the communication center and the personal communication device to determine when the personal communication device is residing in the vehicle. The communication center is further configured to selectively disable any of the personal communication device communication modes when the personal communication device is traveling in the vehicle.

In another embodiment of the present invention, a method for controlling a communication system is provided. The system includes a communication center configured to provide communication services; a personal communication device configured to communicate data via one or more communication modes, wherein the personal communication device is equipped with a first long-range transceiver configured to communicate with the communication center via at least one of the communication modes; a controller installed in a vehicle, said controller configured to cooperate with the communication center and the personal communication device to determine when the personal communication device is residing in the vehicle; and a customer data center configured to provide a customer profile to the communication center. The method includes the step of determining which of the plurality of communication modes is to be disabled is based on the customer profile when the personal communication device is traveling in the vehicle. The method also includes the step of disabling the determined personal communication device communication modes.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
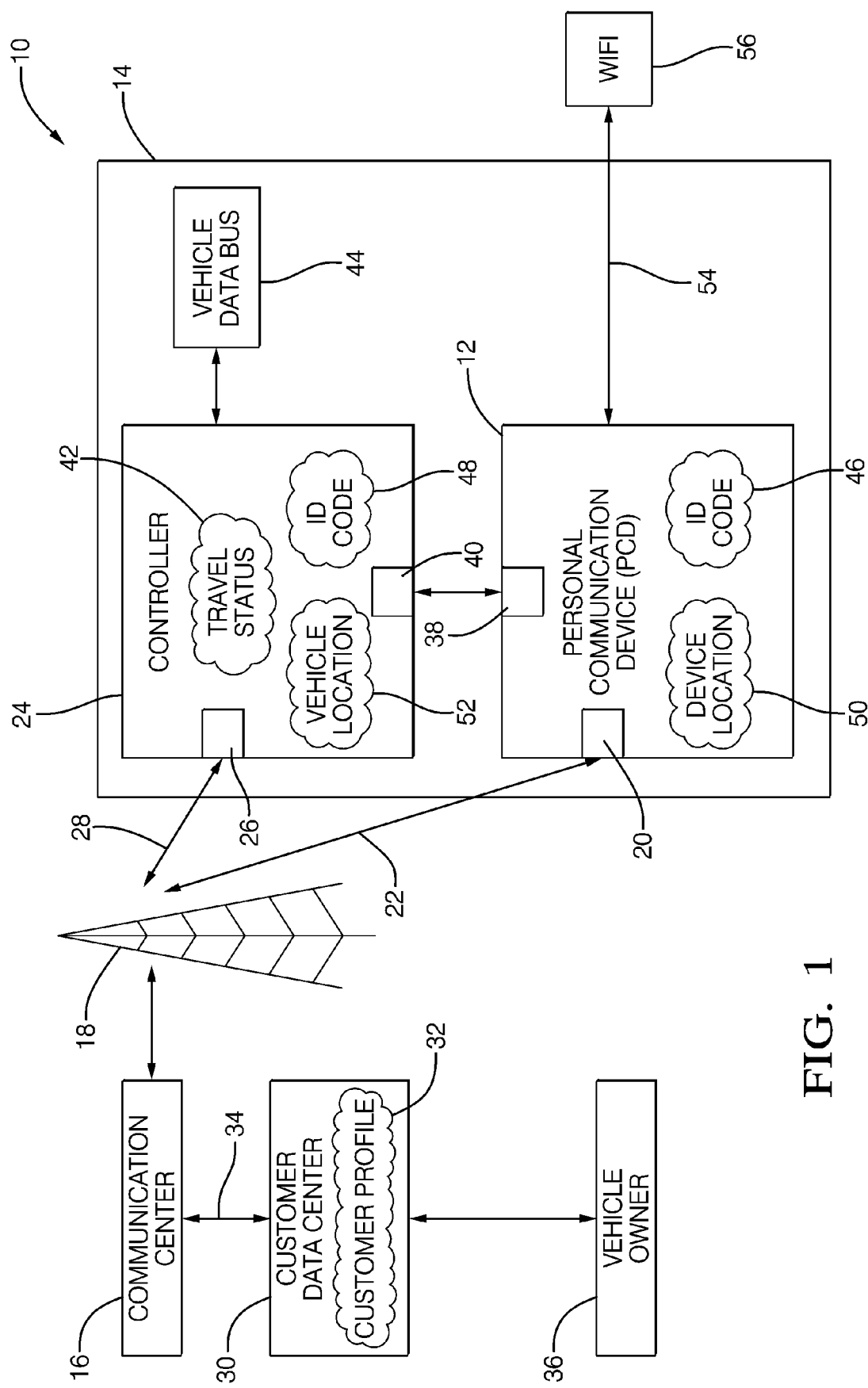
FIG. 1 is a block diagram of a communication system in accordance with one embodiment.

FIG. 1 illustrates a non-limiting example of a system 10 for controlling communication modes of a personal communication device (PCD) illustrated as a box 12, hereafter PCD 12, when the PCD 12 is located in a vehicle illustrated as a box 14, hereafter vehicle 14. The PCD 12 may be, for example, but not limited to, a cellular phone, personal data assistant (PDA), a smart phone such as a Blackberry™ or iPhone™, or other such devices. As such, it is understood that the PCD 12 may be used when either residing in the vehicle 14, or when the PCD 12 is no where near the vehicle 14. In general, suitable devices for PCD 12 are capable of text message communications via a cellular phone network or satellite, but may also include other communication modes such as voice and/or web access via a cellular phone network, satellite, or Wi-Fi™ hot spot when available.

In general, the system 10 provides a way to dynamically control which of the various communication modes of the PCD 12 are enabled or disabled at any given moment so that, for example, a person operating the vehicle 14 is unable to send a text message, and so is less distracted from the task of operating the vehicle 14. By way of example and not limitation, the system 10 may be particularly useful for parents wishing to limit the communication modes available to their teen-age child driving their family car; or for owners/managers of fleets of vehicles wishing to prevent employees from operating cell phones while driving a company vehicle.

The system 10 may include a communication center 16 that provides communication services for the PCD 12. The communication center 16 may be a specific building such as a satellite ground station, or may be a distributed network of communication nodes typically associated with a cellular phone network, as suggested by antenna tower 18 in FIG. 1. Alternatives to the antenna tower 18 may include a network of internet communication nodes such a Wi-Fi™ network 56.

As suggested above, the system 10 may include a PCD 12 configured to communicate data to a person using the PCD 12 via one or more communication modes. The communication modes may include, but are not limited to, two-way voice communication, sending and receiving text messages, sending an internet search commands or an internet page addresses (URL), receiving internet content including text/pictorial information, videos, and interactive games. The PCD 12 may be equipped with a first long-range transceiver 20 configured to communicate with the communication center 16. As used herein, a long range transceiver is generally capable of effectively transmitting a signal a distance greater than 100 meters.

Communication between the PCD 12 and the call center may include transferring voice and/or text message data in either direction along a communication path indicated by arrow 22. Data communicated from the PCD 12 to the communication center 16 may include location information derived from, for example, global positioning satellite (GPS) signals. Data communicated from the communication center 16 to the PCD 12 may include data that may disable certain features of the PCD 12 as will be described in more detail below. For example, the communication center 16 may send data to the PCD 12 that disables the PCD's ability to send a text message, or prevent the PCD 12 from responding to any attempt by a person (not shown) to enter a text message into the PCD 12. Alternatively, the communication center 16 may route all incoming calls/texts to voicemail or a queue for later delivery. It may also permit incoming/outgoing calls only to pre-selected numbers, for example to a parent, an employer, or an emergency service.

The system 10 may include a controller 24 installed in the vehicle 14. The controller 24 may include a processor (not shown) such as a microprocessor or other control circuitry as should be evident to those in the art. The controller 24 may include memory, including non-volatile memory, such as electrically erasable programmable read-only memory (EEPROM) for storing one or more routines, thresholds and captured data. The one or more routines may be executed by the processor to perform steps for processing signals received by the controller 24 directed to controlling which of the communication modes of a PCD 12 are available for use when, for example, the PCD 12 is residing in the vehicle 14 or traveling in the vehicle 14 as described herein.

The controller 24 may be equipped with a second long-range transceiver 26 configured to communicate with the communication center 16 via a communication path indicated by arrow 28. Data communicated from the controller 24 may include location information derived from, for example, global positioning satellite (GPS) signals, and this location information may be independent from the location information originating from the PCD 12 as described above.

The system 10 may include a customer data center 30 configured to store and/or process information regarding a customer profile 32, in particular information regarding services available for a customer (not shown) to use on the PCD 12. The customer profile 32 may also include information useful to determine which of the communication modes are disabled, if any, when, for example, it is determined that the PCD 12 is traveling in the vehicle 14. The customer data center 30 may communicate the customer profile to the communication center 16 via a communication path illustrated by an arrow 34 that may be, for example, a wireless communication path, a wired communication path, or a fiber-optic link.

The customer profile may be established or updated by, for example, a vehicle owner 36 of the vehicle 14, for example a parent of a teenage child who is operating the family vehicle and is the customer who pays for the PCD 12 and associated subscription fees. By way of an example and not limitation, the parent may establish a customer profile that prevents the teenage child from sending or receiving text messages, and/or blocks phone calls from all phone numbers except the parents while traveling in and presumably operating the family vehicle, i.e. the vehicle 14. Alternatively, the vehicle owner may be an owner or manager of a fleet of vehicles and the customer profile may be that of an employee operating one of the fleet vehicles. The owner/manager may establish a customer profile that prevents the employee from receiving or sending text messages while traveling, but allows sending and receiving phone calls as long a hands-free device is being used in conjunction with the PCD 12. As another example, the vehicle owner 36 and the customer operating the PCD 12 may be the same person, and for reasons of personal safety or for reasons of compliance with local laws, the owner/customer may establish a customer profile that prevents some combination or all of communication modes from being available while the PCD 12 is traveling in the vehicle 14.

As used herein, 'residing in the vehicle' means that the PCD 12 is at least in close proximity to the vehicle 14, for example less than three meters from the controller 24. As used herein, 'traveling in the vehicle' means that that some additional vehicle condition is met, for example the vehicle transmission is not in park, or the vehicle 14 is moving at a speed greater than a threshold. By way of example and not limitation, the criteria that the PCD 12 is traveling in the vehicle 14 may be that the both the PCD 12 and the vehicle 14 are at the same distinct locations at the same times and so appear to be moving together. As will be described in more detail below, a determination that the PCD 12 is traveling in the vehicle 14 may be determined in several ways. For example, the communication center 16 may utilizes the device location determination capabilities that are part of the Emergency 911 (E911) mandates to self-determine the position of both the vehicle and the PCD. The particular criteria that determine that the vehicle is traveling may be determined when the customer profile is established. It is noted that all communication modes do not necessary go through the communication center 16, however the communication center 16 may be configured to disable communication modes that the PCD 12 uses to communicate with other systems such as the Wi-Fi™ network 56.

In a first embodiment, the PCD 12 may be equipped with a first short range transceiver 38 configured to transmit a communication device identity code 46 that uniquely identifies the PCD 12. The controller 24 may be equipped with a second short range transceiver 40 configured to receive the communication device identity code 46 when the PCD 12 is residing in the vehicle 14. As used herein, a short range transceiver is generally only effective for relatively short distances, less than 3 meters for example. If the effective range is too great, then there is a risk that it will be erroneously determined that the PCD 12 is traveling in the vehicle 14 when the PCD is actually outside the vehicle, for example traveling in a different vehicle but proximate to the vehicle 14. A suitable example of a short range transceiver type is a Bluetooth™ transceiver that is well known by those in the art. The short range transceivers 38, 40 may also be configured to estimate distance based on received signal strength in order to avoid some instances of erroneously designating the PCD 12 as being within or residing in the vehicle 14. Also, an antenna (not shown) of the second short range transceiver 40 may be configured to detect when the PCD 12 is likely being held by the driver of the vehicle 14, and so the system 10 may be able to not disable communication modes if the PCD 12 is being operated by person in any seat other than the driver seat. In this first embodiment, if the controller 24 transmits the communication device identity code 46 to the communication center 16, the communication center 16 may determine that the PCD 12 is traveling in the vehicle 14.

In this first embodiment, the controller 24 may be configured to determine a travel status 42 of the vehicle 14 and communicate the travel status 42 to the communication center 16. As used herein, the travel status 42 may be determined based on GPS signals received by the controller 24 (GPS receiver not shown), or may be based on vehicle information received from a vehicle data bus 44. Information received from the vehicle data bus 44 may include, but is not limited to, vehicle speed, transmission gear selected, engine running status (e.g. ON/OFF), and/or the number of occupants in the vehicle. The number of occupants or other travel status information may be applied to the customer profile 32 in order to determine which communication modes of the PCD 12 should be disabled.

In a second embodiment the PCD 12 and the controller 24 may be equipped with short range transceivers 38, 40 as described above, but in this embodiment the second short range transceiver 40 may be configured to transmit a vehicle identity code 48 that uniquely identifies the controller 24 or the vehicle 14. The PCD 12 may be configured to receive the vehicle identity code 48 when the PCD 12 is residing in the vehicle 14. Then, if the PCD 12 transmits the vehicle identity code 48 to the communication center 16, the communication center 16 may determine that the PCD 12 is traveling in the vehicle 14.

Similar to the description above, the controller 24 may determine the travel status 42 of the vehicle. In this second embodiment, the controller 24 may be configured to transmit the travel status 42 to the PCD 12, and the PCD 12 may be configured to communicate the travel status 42 to the communication center 16. By this, the communication center 16 is provided with information to determine which of the communication modes of the PCD 12 are disabled based on the travel status 42.

In a third embodiment, the PCD 12 may be configured to determine a device location 50 of the personal communication device and communicate the device location to the communication center 16, and the controller 24 may be configured to determine a vehicle location 52 of the vehicle 14 and communicate the vehicle location 52 to the communication center 16. This third embodiment may exclude equipping the PCD 12 and the controller 24 with the short range transceivers 38, 40, and so decrease the cost of the system 10. The communication center 16 may determine that the PCD 12 is traveling in the vehicle 14 when the device location and vehicle location coincide. As used herein, 'coincide' means that the device location 50 and the vehicle location 52 are close enough that it can be assumed that the PCD 12 is residing in the vehicle 14. Optionally, the communication center may track the device location 50 and the vehicle location 52 in order to determine that the PCD 12 and the vehicle 14 are traveling together for a distance and/or at a speed that it can be assumed that the PCD 12 is traveling in the vehicle 14. Similar to the description above, the controller 24 may communicate the travel status 42 to the controller in order to help determine which of the communication modes are disabled based on the travel status.

In a fourth embodiment, the PCD 12 may be configured to determine a personal communication device location 50 of the PCD 12 and communicate the personal communication device location 50 to the communication center 16, and the communication center 16 determines which of the communication modes are disabled based solely on the personal communication device location 50. A system 10 configured like this may be useful for a business to disable some communication modes on a company supplied PCD 12 when the PCD 12 is being used at a location outside or off the company property. In a fifth embodiment, the system 10 may be configured to determine which of the communication modes are disabled based on the time of day. This feature may also be useful for a business to control the use of a company supplied PCD 12.

Figure 2:
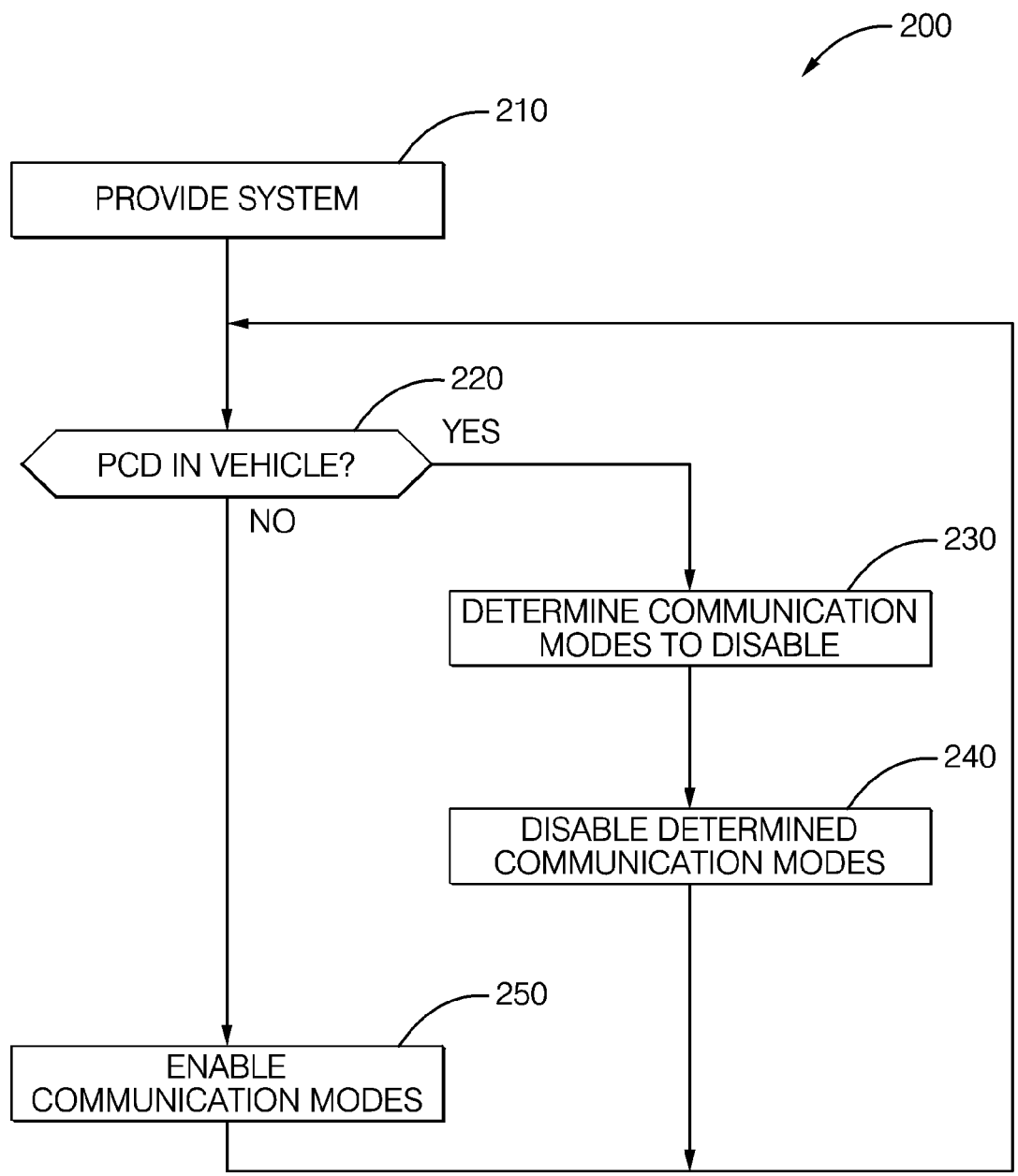
FIG. 2 is a flow chart of a method of operating the communication system of FIG. 1 in accordance with one embodiment.

FIG. 2 illustrates a non-limiting example of a method 200 for controlling the system 10.

Step 210, PROVIDE SYSTEM, may include providing a communication center 16 configured to provide communication services. For example, the communication center 16 may be a wireless service provider that provides voice communication, text messaging, and web access services. Step 210 may also include providing a personal communication device (PCD) 12 configured to communicate data via one or more communication modes. Example communication modes include voice communication, text message communication, and web based communication. All of the communication modes are not necessarily provided by the communication center 16. For example the PCD 12 may access a Wi-Fi™ network via a known wireless communication path indicated by arrow 54. The PCD 12 may be equipped with a first long-range transceiver 20 configured to communicate with the communication center 16 via at least one of the communication modes. Step 210 may also include providing a controller 24 installed in a vehicle 14 and configured to cooperate with the communication center 16 and the PCD 12 to determine when the personal communication device is residing in the vehicle. The controller 24 may be equipped with a second long-range transceiver 26 configured to communicate with the communication center 16. Step 210 may also include providing a customer data center 30 configured to provide a customer profile 32 to the communication center 16. The customer profile 32 may be used by the communication center 16 to determine which of the communication modes available to the PCD 12 should be disabled in the event that certain circumstances arise such as the PCD 12 traveling in the vehicle 14.

Step 220, PCD IN VEHICLE?, may include determining that the PCD 12 is residing in the vehicle 14 and/or traveling in the vehicle 14. If NO, for example the PCD 12 is neither residing nor traveling in the vehicle 14, then the method 200 proceeds to step 250 where all the communication modes may be enabled. If YES, then the method 200 may proceed to step 230. That the PCD 12 is traveling in the vehicle 14 may be determined by any of several methods as described above with regard to the first through the fifth embodiments. In general, the various embodiments suggest ways that the PCD 12, the controller 24, and the communication center 16 can cooperate to determine that the PCD 12 is traveling in the vehicle 14.

Step 230, DETERMINE COMMUNICATION MODES TO DISABLE, may include determining which of the plurality of communication modes is to be disabled is based on the customer profile 32. The customer profile is generally established by the vehicle owner 36, but alternatively may be established by the owner of the PCD 12, who may or may not be the vehicle owner 36.

Step 240, DISABLE DETERMINED COMMUNICATION MODES, may include disabling the determined communication modes of the PCD 12. This may be by way of sending a data stream to the PCD 12 configured to disable the ability of the PCD to perform certain tasks. Alternatively, the communication center may send a message to the PCD 12 indicating to whoever is using the PCD 12 that certain communication modes are being blocked by the communication center 16.

Step 250, ENABLE COMMUNICATION MODES, may include determining that the PCD 12 is not traveling in the vehicle 14. This may be by way of the communication center 16 not receiving an indication that the PCD 12 is traveling in the vehicle 14 for some predetermined period of time, or by way of the controller or the PCD 12 sending an indication that the PCD 12 is not traveling in the vehicle 14.

Accordingly, a system 10 and a method 200 of controlling communication modes of a personal communication device traveling in a vehicle are provided. The system and method provide a way for a parent to limit the communication modes of a personal communication device (PCD) used by a child, especially when the child is traveling in and presumably operating a particular vehicle such as the family car. The system and method may also be used by employers to limit the PCD capabilities of employees operating company vehicles. A communication center is configured to determine when certain communication modes are disabled. By having the communication center determine when certain communication modes are disabled, the risk of the child or employee over-riding or bypassing the disabling action is reduced. As such, when the determination of which communication modes are disable is based on a customer profile, the parent or employer can establish or alter the customer profile without having physical access to the PCD. By having the communication center determine when to disable certain communication modes, the communication center can base the decision on more sophisticated criteria than simply detecting that the PCD is moving at a speed greater than a threshold, for example communication modes can be blocked just by the vehicle transmission not being in park. Also, the communication center and can selectively block or allow communications from particular sources, such as allowing the child to make or receive phone calls to or from the parent.

While this invention has been described in terms of the preferred embodiments thereof, it is not intended to be so limited, but rather only to the extent set forth in the claims that follow.

We claim:

1. A system for controlling communication modes of a personal communication device traveling in a vehicle, said system comprising:
   a communication center configured to provide communication services;
   a personal communication device configured to communicate data via one or more communication modes, wherein the personal communication device is configured to determine a device location of the personal communication device, and equipped with a first long-range transceiver configured to communicate the device location to the communication center via at least one of the communication modes; and
   a controller installed in a vehicle, wherein the controller is configured to determine a vehicle location of the vehicle, and equipped with a second long-range transceiver configured to communicate the vehicle location to the communication center,
   wherein the communication center is further configured to selectively disable any of the personal communication device communication modes when the device location and the vehicle location coincide.

2. The system in accordance with claim 1, wherein a determination of which of the plurality of communication modes is disabled is based on a customer profile.

3. The system in accordance with claim 2, wherein the customer profile is communicated to the communication center by a customer data center.

4. The system in accordance with claim 1, wherein
   the personal communication device is equipped with a first short range transceiver configured to transmit a communication device identity code of the personal communication device,
   the controller is equipped with a second short range transceiver configured to receive the communication device identity code when the personal communication device is residing in the vehicle, and
   the communication center is further configured to determine that the personal communication device is traveling in the vehicle when the controller transmits the communication device identity code to the communication center.

5. The system in accordance with claim 4, wherein
   the controller is further configured to determine a travel status of the vehicle and communicate the travel status to the communication center, and
   the communication center is further configured to determine which of the communication modes are disabled based on the travel status.

6. The system in accordance with claim 5, wherein the travel status is based on an indication of vehicle speed.

7. The system in accordance with claim 5, wherein the travel status is based on an indication of a selected gear of the vehicle transmission.

8. The system in accordance with claim 1, wherein
   the controller is further configured to determine a travel status of the vehicle, and
   the communication center is further configured to determine which of the communication modes are disabled based on the travel status.

9. The system in accordance with claim 8, wherein the travel status is based on an indication of vehicle speed.

10. The system in accordance with claim 8, wherein the travel status is based on an indication of a selected gear of the vehicle transmission.

11. The system in accordance with claim 1, wherein
    the controller is equipped with a second short range transceiver configured to transmit a vehicle identity code of the controller,
    the personal communication device is equipped with a first short range transceiver configured to receive the vehicle identity code when the personal communication device is residing in the vehicle, and
    the communication center is further configured to determine that the personal communication device is traveling in the vehicle when the personal communication device transmits the vehicle identity code to the communication center.

12. The system in accordance with claim 11, wherein
    the controller is further configured to determine a travel status of the vehicle and communicate the travel status to the personal communication device,
    the personal communication device is further configured to communicate the travel status to the communication center, and
    the communication center is further configured to determine which of the communication modes are disabled based on the travel status.

13. The system in accordance with claim 12, wherein the travel status is based on an indication of vehicle speed.

14. The system in accordance with claim 12, wherein the travel status is based on an indication of a selected gear of the vehicle transmission.

15. The system in accordance with claim 1, wherein
    the communication center is further configured to determine which of the communication modes are disabled based on the time of day.

* * * * *